United States Patent [19]

Molnar

[11] Patent Number: 4,671,550
[45] Date of Patent: Jun. 9, 1987

[54] BUMPER BEAM

[75] Inventor: Arpad A. Molnar, Federal Way, Wash.

[73] Assignee: Arpi Co., Federal Way, Wash.

[21] Appl. No.: 751,033

[22] Filed: Jul. 1, 1985

[51] Int. Cl.$^4$ .................................................. B60R 19/03
[52] U.S. Cl. .................................... 293/120; 293/102; 428/31; 428/71
[58] Field of Search ............... 293/102, 109, 120, 121, 293/126, 136, 146, 148; 428/31, 71, 76, 117; 156/245; 264/321, 46.4, 46.9

[56] References Cited

U.S. PATENT DOCUMENTS

| | | | |
|---|---|---|---|
| D. 137,039 | 1/1944 | Cadwallader . | |
| 780,298 | 1/1905 | MacCarthy . | |
| 943,418 | 12/1909 | Kanski . | |
| 2,873,933 | 2/1959 | Savke | 293/62 |
| 2,986,419 | 5/1961 | Barenyl | 293/62 |
| 3,441,305 | 4/1969 | Trammell, Jr. | 293/1 |
| 3,666,310 | 5/1972 | Burgess et al. | 293/120 X |
| 3,827,741 | 8/1974 | Howell et al. | 293/99 |
| 3,894,763 | 7/1975 | Barenyi | 293/1 |
| 3,937,508 | 2/1976 | Glance et al. | 293/63 |
| 3,979,110 | 9/1976 | Newton | 293/120 X |
| 4,002,362 | 1/1977 | Sears et al. | 293/62 |
| 4,059,301 | 11/1977 | Meyer | 293/62 |
| 4,066,285 | 1/1978 | Hall et al. | 293/62 |
| 4,106,804 | 8/1978 | Scrivo | 293/63 |
| 4,193,621 | 3/1980 | Peichi et al. | 293/142 |
| 4,208,069 | 1/1980 | Huber et al. | 293/102 |
| 4,348,042 | 9/1982 | Scrivo | 293/122 X |
| 4,386,799 | 1/1983 | Molnar | 293/120 |
| 4,504,534 | 3/1985 | Adachi et al. | 293/120 X |
| 4,509,782 | 4/1985 | Manning | 293/109 X |
| 4,542,925 | 9/1985 | Huber et al. | 293/109 X |
| 4,545,105 | 10/1985 | Kowalsky | 293/120 X |
| 4,556,438 | 12/1985 | Hoffmeister et al. | 264/46.9 X |

FOREIGN PATENT DOCUMENTS

| | | | |
|---|---|---|---|
| 2600421 | 7/1977 | Fed. Rep. of Germany | 293/120 |
| 3325104 | 1/1985 | Fed. Rep. of Germany | 293/102 |
| 0078844 | 5/1983 | Japan | 293/102 |

OTHER PUBLICATIONS

Press Release dated 2/17/81 "A Light-Weight, Shock-Absorbing Bumper at a Very Low Cost".

Primary Examiner—Randolph A. Reese
Assistant Examiner—Russell R. Stormer
Attorney, Agent, or Firm—Christensen, O'Connor, Johnson & Kindness

[57] ABSTRACT

Disclosed is a bumper beam formed of a plurality of elongate sections. The sections are formed of composite material comprising both longitudinal fibers and random fibers embedded within a resin matrix. The longitudinal fibers extend continuously between the opposing ends of the bumper beam with their longitudinal axes being substantially parallel to the longitudinal axis of the beam. The random fibers have their longitudinal axes randomly oriented with respect to the longitudinal axis of the beam. The longitudinal fibers comprise 70–85% of the total weight of the longitudinal and random fibers. The cross-sectional shapes of the sections are such that when subjected to the stresses induced by a collision, the outermost sections will tend to deflect in the lateral direction.

10 Claims, 6 Drawing Figures

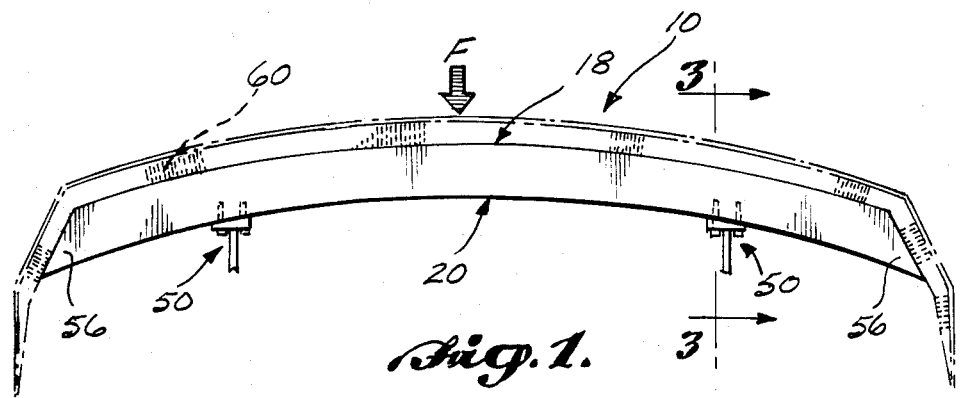
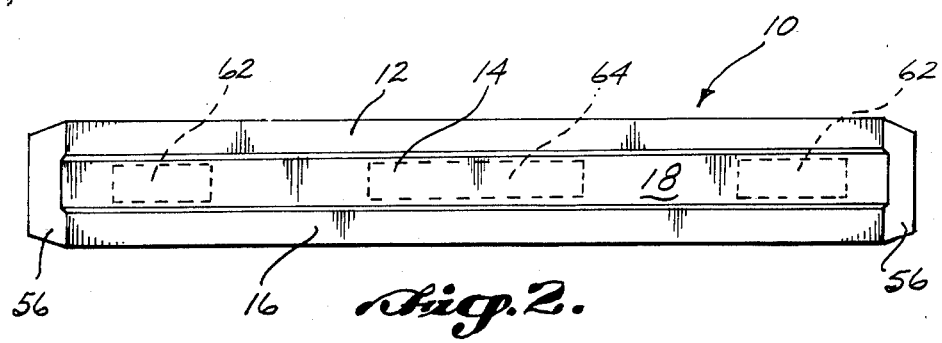
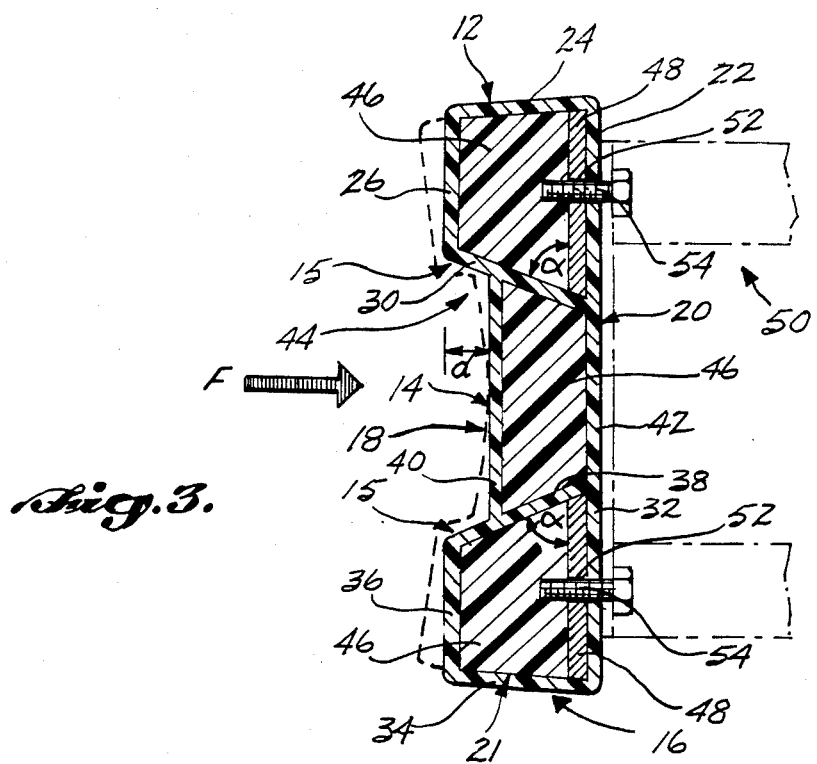

BUMPER BEAM

BACKGROUND OF THE INVENTION

This invention relates to automobile bumpers, in particular to the underlying structural member of a bumper known as a bumper beam.

As is well known, bumpers are attached to the front and rear of vehicles and used for absorbing shock or preventing vehicle damage resulting from a collision. Currently, important considerations underlying the design of vehicle bumpers are: (1) increasing the bumper's capability to withstand impacts while (2) minimizing the weight of the bumper to increase the fuel efficiency of the vehicle to which it is attached.

Past attempts to improve bumpers have resulted in bumpers which do not effectively meet both design goals noted above. Some designs have focused on covering a rigid (usually steel) bumper beam with various energy absorbing devices. See, for example, the patent issued to Montgomery, U.S. Pat. No. 4,061,384. Utilizing a steel bumper beam obviously adds considerable weight to the vehicle, thus reducing vehicle fuel efficiency. Other approaches have been to substitute a molded flexible bumper formed of material such as polypropylene resin for rigid metal bumpers of the past. See, for example, the patent issued to Adachi et al., U.S. Pat. No. 4,504,534. Bumpers formed of such material are lighter in weight than bumpers employing steel beams and have the ability to absorb the energy transmitted by very minor impacts. However, without using an underlying bumper beam having a stiffness, especially in the longitudinal direction, comparable to a metal beam, these latter bumpers cannot withstand substantial impacts.

SUMMARY OF THE INVENTION

This invention is directed to a bumper beam formed of materials that are lightweight compared to metal, and constructed in a manner such that it has significant longitudinal stiffness in order to withstand substantial impacts. The bumper beam formed in accordance with this invention comprises one or more elongate sections having walls formed of composite material. The composite material comprises both longitudinal fibers and random fibers embedded within a resin matrix. The longitudina fibers extend continuously between the opposing ends of the bumper beam with their longitudinal axes being substantially parallel to the longitudinal axis of the beam. The random fibers have their longitudinal axes randomly oriented with respect to the logitudinal axis of the beam. The longitudinal fibers comprise 70-85% of the total weight of the longitudinal and random fibers. This positioning of the fibers provides a beam that, while having significant longitudinal stiffness, remains flexible in the lateral direction to absorb energy without fracture.

As another aspect of this invention the cross-sectional shapes of the sections are configured so that when the beam is subjected to the stresses induced upon collision, the sections of the bumper beam will tend to deflect in the lateral direction reducing the prospect of fracture of the beam.

BRIEF DESCRIPTION OF THE DRAWINGS

FIG. 1 is a plan view of one typical embodiment of a bumper beam formed in accordance with this invention, including an energy absorbing cover;

FIG. 2 is a front elevational view of the bumper beam of FIG. 1 with the energy absorbing cover removed to show the front of the beam;

FIG. 3 is a transverse cross-sectional view of the bumper beam of FIG. 1 taken along line 3—3;

DETAILED DESCRIPTION OF THE PREFERRED EMBODIMENT

Figure 4:
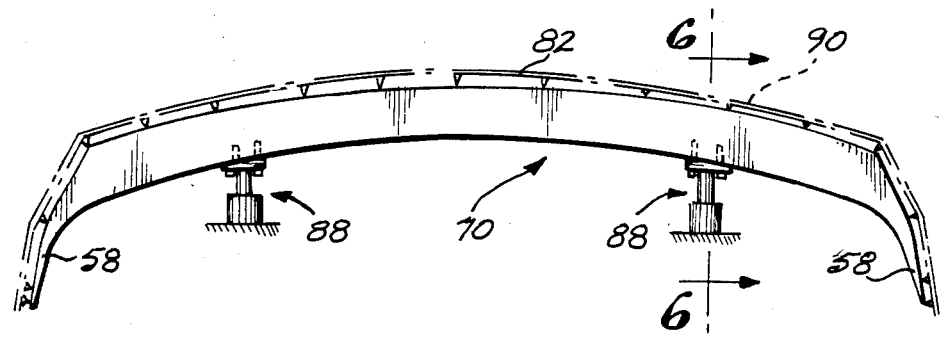
FIG. 4 is a plan view of an alternative embodiment of this invention, including an energy absorbing cover.

Referring initially to FIGS. 1, 2 and 3, bumper beam 10 formed in accordance with this invention is disclosed as an elongate element having three integrally formed sections: a top section 12, a center section 14, and a bottom section 16, which extend the length of the beam. The beam has a front 18 and a back 20. The back 20 faces the vehicle to which the bumper beam 10 is attached.

The cross section of the top section 12 is generally trapezoidal, defined by a back wall 22, an outer sidewall 24, a front wall 26, and an inner sidewall 30. The bottom section 16 is configured in cross section to be the mirror image of the top section about a plane extending through the longitudinal axis of the bumper beam. The bottom section 16 has a back wall 32, an outer sidewall 34, a front wall 36 and an inner sidewall 38. The top section 12 and the bottom section 14 are configured so that their outer walls 24 and 34 diverge from the front 18 to the back 20 of the bumper while the inner sidewalls 30 and 38 converge from front to back.

The center section 14 is defined by a front wall 40 and a back wall 42 that extend between the facing inner sidewalls of the top section and bottom section. It will be understood that while the embodiment of the invention being considered here is formed of three longitudinal sections, one, or any greater number, are also considered to be within the scope of this invention so long as the function and advantages of the present invention, as discussed hereafter, are achieved.

With reference to FIG. 3 the top section 12 and bottom section 16 have substantially the same transverse cross-sectional thickness as measured from their back walls 22 and 32, respectively, to their front walls 26 and 36, respectively. The center section 14 is thinner in this direction thus defining a longitudinal recess 44 extending along the front of the beam.

The walls of the sections are formed of composite material, namely glass fibers embedded with a thermosetting isopolyester resin matrix. Alternatively, other suitable fiber/resin combinations could be utilized. For example, the fibers may also be formed of graphite; the resin could be epoxy or other thermosetting or thermoplastic resins having similar characteristics.

Referring to FIG. 3, the walls of each section 12,14 and 16 are formed to surround core segments 46 of rigid polyurethane foam having a density of approximately four pounds per cubic foot. The core segments 46 provide additional strength and energy absorption capability without adding significant weight to the beam. While the described polyurethane foam has been found to be effective, other resilient material having a density other than four pounds per cubic foot may also be used. Balsa wood is an example of another alternative material that is suitable for use as a core segment 46.

In order to secure the bumper beam to a vehicle, a mounting bolt retainer 48, typically formed of a substantially flat rectangular piece of lightweight metal such as aluminum, is positioned inside the top and bottom sections 12 and 16 flat against their back walls 22 and 32, respectively. As shown, each bolt reatainer 48 fits snugly between the inner and outer sidewalls of the top and bottom sections 12 and 16. These bolt retainers 48 are located at two spaced locations along the beam 10 corresponding to the locations of the two mounting brackets 50 which project outwardly from the frame of the vehicle (FIG. 1). A pair of threaded apertures 52 are provided within each bolt retainer 48 to receive bolts 54 that extend through associated holes in the mounting brackets 50. The brackets to which beam 10 is mounted can be of any standard design including fixed (FIG. 1) or conventional piston and cylinder-type energy absorbing brackets.

Use of the composite material to form the walls of the sections results in a lightweight bumper beam that provides substantial longitudinal stiffness to resist impacts against the bumper. In this regard, the composite material that forms the walls of the top, center and bottom sections contains a multitude of continuous fibers that are arranged to extend along the entire length of the bumper beam with their longitudinal axes being substantially parallel to the longitudinal axis of the beam. For convenience, these fibers are hereinafter referred to as "longitudinal fibers." The composite material also includes a number of fibers that are randomly oriented with respect to the beam's axis (hereinafter, "random fibers").

The fibers, which are made of glass (or graphite, etc.) are anistropic. Specifically, they exhibit substantial tensile and compression strength in their longitudinal direction while having minimal lateral rigidity. Thus, the longitudinal fibers provide the greatest strength to the beam in the longitudinal direction. The advantage of such orientation becomes clear when the action of the beam during a collision is more closely considered. Referring to FIG. 1, a bumper beam is shown mounted in conventional fashion to two brackets 50. As is well known, a typical colliding force F applied to the beam 10 in the direction shown by the arrow in the figure will create substantial compression stress in the longitudinal direction of the beam along the front surface thereof, that is, the surface defined by the front walls 26, 40 and 36 of the top, center and bottom sections 12, 14, and 16, respectively. Simultaneously, considerable longitudinal tensile stress is created in the back surface of the beam, i.e., the surface defined by the abutting back walls 22, 42 and 32 of the sections. It can be readily appreciated that since the bumper beam is constructed of sections having their greatest tensile and compression strength aligned with the longitudinal direction of the beam, the beam will be most effective in resisting the compression and tensile stresses resulting from a collision. In the preferred embodiment the percentage of fibers oriented as longitudinal fibers is 80% of the total weight of fibers in the composite material. It is contemplated that slightly more or less than 80% can be so oriented with no substantial detrimental effects on the beam's performance.

While it has been indicated that the longitudinal fibers extend along the entire length of the bumper beam, it is understood that it is not necessary that each single fiber must extend from one end of the beam to another. It is preferred that at every point along the beam substantially 80% of the fibers are "longitudinal" as described above. Hence, as an alternative to having each single fiber extending from one end to the other, a continuous series of shorter overlapped fibers can be used.

In addition to its longitudinal strength and resistance to bending, the configuration of the sections 12, 14 and 16 is such that upon impact, the protruding top and bottom sections 12 and 16, respectively, will tend to deflect, or flex, laterally inwardly (that is, toward the center section 14) thereby reducing the chance of permanent deformation or fracture of the section's walls. Specifically, with reference to FIG. 3, the recess 44 formed between the protruding portions 15 of the top and bottom sections allows those sections to deflect (as shown in the dotted lines of FIG. 3) toward each other without destroying the integrity of the overall beam. The depth of the recess 44 can be altered for any particular design requirements—increasing the depth to increase the flexibility of the top and bottom sections; decreasing the depth to increase the rigidity of the beam.

Additionally, the overall rigidity of the beam can be modified by changing the general cross-sectional shape of the top and bottom sections 12 and 16, respectively. In particular, if the angle $\alpha$ (see FIG. 3) between the inner sidewalls 30 and 38 and the associated back walls 22 and 32 of the top and bottom sections 12 and 16 respectively is altered, the flexibility of the top and bottom sections with respect to the lateral deflection discussed above will also change. Specifically, as angle $\alpha$ approaches 90° the flexibility of the sections will increase. As $\alpha$ decreases from 90° the flexibility of the top and bottom sections will decrease, thereby resulting in a more rigid beam.

When the net colliding force acts on the beam at a point located away from its longitudinal axis, the lateral deflection of the beam will be a measure of its torsional stiffness. The just described effects of varying the angle $\alpha$ are also applicable to changes in the torsional rigidity of the beam. As angle $\alpha$ approchaes 90°, the torsional stiffness decreases. As $\alpha$ decreases from 90°, the torsional stiffness of the beam increases.

The rigidity requirements for a particular beam will be based upon determinations of the mass of the vehicle to which it is attached and the minimum force the bumper must withstand. In one typical embodiment the recess 44 is approximately one third as deep as the the thickness of the overall beam as measured from front 18 to back 20. The angle $\alpha$ is approximately 75°. These dimension, in addition to an average wall thickness of 0.100 inches and a fiber-to-resin ratio of 65:35, are suitable for a midsize automobile required to survive a five mile per hour collision with no significant damage when the bumper is mounted to a vehicle by conventional shock-absorbing-type brackets.

The above dimensions are found to provide an optimal strength-to-weight ratio for the bumper beam under the conditions described. It is contemplated that a lower fiber-to-resin ratio such as 35:65 can be used; however, in order to maintain a sufficient amount of longitudinal fibers for longitudinal stiffness, the average wall thickness of the bumper beam must be proportionately increased. The increased wall thickness would, of course, increase the weight of the beam.

The randomly-oriented fibers and resin do provide limited longitudinal stiffness and it is noted that a beam formed of composite material having solely randomly-oriented fibers can be constructed to perform substantially as the beam made in accordance with this invention. However, without the continuous longitudinal fibers, such a beam would require significantly more composite material to duplicate the longitudinal stiffness of the beam described above. Hence the advantage of a lightweight fuel-saving bumper beam is lost.

With reference to FIG. 3, the angle α is such that the inner sidewalls 30 and 38 will obliquely intersect a plane that is parallel to the front of the bumper. Thus, impacts, which are generally directed normal to that plane, will create a bending, or other than crushing, action in the inner sidewalls, enhancing the lateral inward deflection of the top and bottom sections. With the inner sidewalls 30 and 38 inclined with respect to the direction of the collision force they will bend in the lateral direction in response to that force and there is less likelihood of those walls being crushed or otherwise permanently deformed.

It is contemplated that a bumper incorporating the present invention and having only a pair of sections and a single obliquely angled inner sidewall would also be within the scope of this invention. Of course, such a structure would be somewhat less resistant to deformation under impact due to the reduction in the number of sidewalls, but this could be compensated for, such as by increasing the thickness of the sidewalls. It is also contemplated that with proper external sidewall design, the present invention could be embodied in a beam having a single section.

Formation of the bumper beam in the multiple-section structure just described, may be carried out in several alternative ways. In one example, composite material formed of strips of collimated glass or graphite fibers preimpregnated with thermosetting resin are wrapped (also known as "layed up") around the previously described core segments 46, which have the desired shape of the sections. The composite material is layed up so that, as noted, approximately 80% of the fibers therein are aligned with the longitudinal axis of the beam. The cores are placed in side-by-side abutting relationship and a layer of composite material is wrapped around all of the abutting segments. Finally the entire beam is cured in a compression mold as is well known in the are. As an alternative, a "wet" layup method can be used wherein the glass or graphite fibers are coated with a liquid resin just prior to curing.

In some cases, for example where a substantially straight beam is desired, a hollow core bumper beam can be constructed through the use of a conventional pultrusion process. If desired, the hollow beam formed in this manner may be later filled with a plastic foam.

The bumper beam formed in accordance with this invention can be shaped to meet a variety of automobile design requirements. For example, the bumper beam can be molded into any desired curvature. Furthermore, the ends of the beam can be shaped as necessary. In this regard, and with reference to FIGS. 1 and 2, the ends 56 of the beam 10 taper over a relatively short distance. This taper is simply accomplished by bringing the front walls and the back walls of each section together as the inner and outer sidewalls taper. If desired, the taper of the beam end can be much more gradual and curved to form ends 58 (FIG. 4) that wrap around the corners of the vehicle.

Once the bumper beam 10 is cured, any suitable energy absorbing material can be attached by conventional means to the front 18 of the bumper beam. For example, shown attached to the front of bumper beam 10 in FIG. 1 is a thermoplastic fascia 60 with underlying cellular energy absorbing media. Such material offers substantial resistance to impacts directed to the front of the beam while, due to its cellular construction, adding little weight to the bumper. The fascia 60 can be formed to extend beyond the ends 56 of the bumper beam and attach to the sides of the vehicle (not shown). It is pointed out that the bumper beam can function as a complete bumper with or without the energy absorbing material. Where no energy absorbing material is required, for example, on rear bumpers of small trucks, the bumper beam formed in accordance with this invention provides a strong, lightweight substitute for heavy bumpers of the past.

If desired, openings 62, shown in dashed lines in FIG. 2, may be formed in the beam 10 to accommodate parking lights. Alternatively or in addition, opening 64 may be formed to provide airflow to the engine. The thickness of the walls of the sections that remain intact can be increased to compensate for any loss of strength caused by the inclusion of openings 62 and 64.

Figure 5:
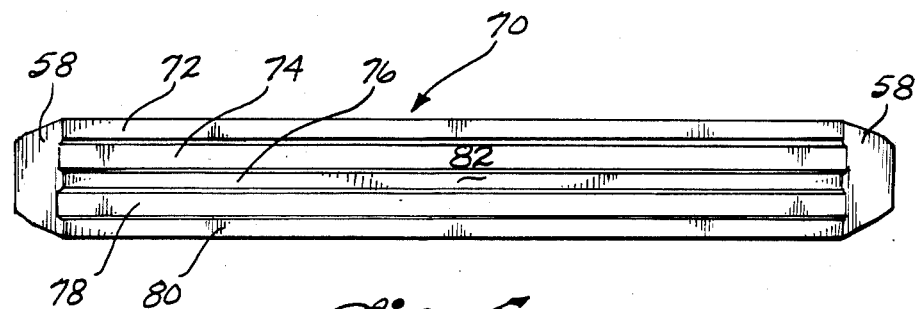
FIG. 5 is a front elevational view of the bumper beam of FIG. 4 with the energy absorbing cover removed to show the front of the beam.
Figure 6:
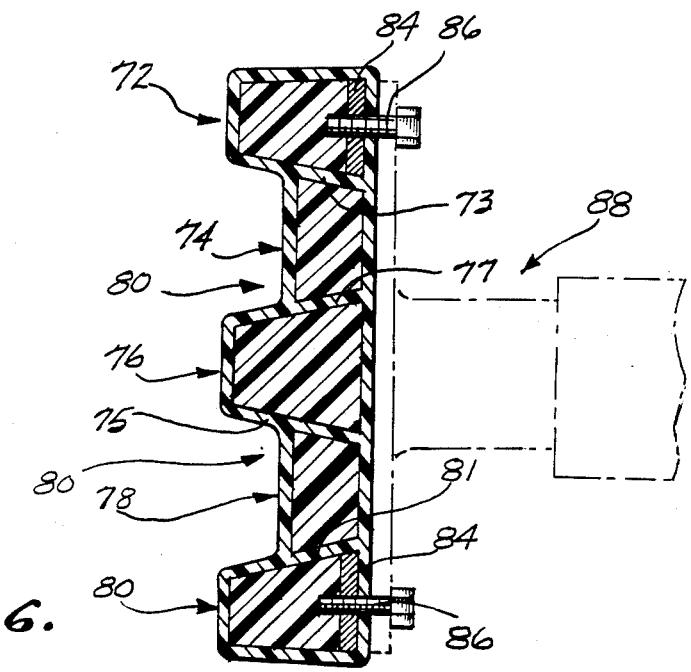
FIG. 6 is a transverse cross-sectional view of the alternative embodiment of FIG. 4 taken along line 6—6.

An alternative embodiment 70 of the bumper beam is shown in the three views of FIGS. 4, 5 and 6. In this embodiment there are five laterally abutting sections: a top section 72, a first intermediate section 74, a middle section 76, a second intermediate section 78, and a bottom section 80. The sections of embodiment 70 are substantially trapezoidal in shape and formed of material, and constructed in a manner, as described for the embodiment of FIGS. 1–3 discussed above.

In this alternative the middle section 76 protrudes outwardly from between the first and second intermediate sections 74 and 78. The middle section 76 provides additional rigidity for the overall beam without interfering with the ability of the protruding sections to deflecting the lateral direction as earlier discussed. In this case, a pair of longitudinal recesses 80 are formed in the front 82 of the beam and provide for the lateral deflection of the top, middle and bottom sections in a manner as described earlier. Furthermore, the inner sidewalls 73 and 81 of the top and bottom sections, respectively, and both sidewalls 75 and 77 of the middle section 76 are obliquely inclined with respect to a plane that is parallel to the front of the bumper. As before, this angularity reduces the prospects of crushing the walls of the protruding sections upon impact.

Mounting bolt retainers 84 are located within the top and bottom sections 72 and 80. The mounting bolt retainers cooperate with bolts 86 extending from piston and cylinder-type energy-absorbing brackets 88 to provide a means for securing the beam 70 to the vehicle as earlier described. A thermoplastic fascia with underlying support ribs 90 (FIG. 4) is attached by conventional means to the front 82 of the beam 70. It is understood that the beam is capable of supporting any conventional energy absorbing covering.

While the above description relates to the use of bumper beams on vehicles, it is clear that such a beam would provide protection for any container, machine, etc. where protection from collisions is desired. Accordingly, it is understood that various changes in the details, materials and configuration of the bumper beam, which has been herein described and illustrated in order to explain the nature of the invention, may be made by those skilled in the art within the principle and scope of the invention as expressed in the appended claims.

The embodiments of the invention in which an exclusive property or privilege is claimed are defined as follows:

1. An elongate bumper beam having a front surface facing a direction of expected impact, said beam comprising a center section, a top section, and a bottom section joined in laterlly abutting relation, the center, top and bottom sections having walls formed of composite material, a portion of a wall of the center section being integrally formed with an adjacent portion of a wall of the top section, and a portion of a wall of the center section being integrally formed with an adjacent portion of a wall of the bottom section, the walls of each section defining an enclosed space within that section.

2. The bumper beam of claim 1, wherein the plane formed by the abutting walls of any two abutting sections obliquely intersects the plane parallel to the front surface of the bumper beam.

3. The bumper beam of claim 1, wherein the each enclosed space are filled with rigid polyurethane foam having a density of approximately 4 lbs. per cubic foot.

4. The bumper beam of claim 3, wherein the spaces are filled with balsa wood.

5. The bumper beam of claim 1, further including attachment means for attaching the bumper beam to one or more fasteners extending from a vehicle or the like, the attachment means including a flat retainer plate located within the walls of at least one section, the retainer plate being engageable with an associated fastener extending from the vehicle.

6. The bumper beam of claim 1, wherein the center section is configured to define a recess in the front side of the bumper beam between the top and bottom sections.

7. An elongate bumper beam having a front surface facing a direction of expected impact, the beam comprising a top section, a middle section and bottom section and first and second intermediate sections, all joined in laterally abutting relation, the top, middle, bottom and first and second intermediate sections having walls formed of composite material, the walls of each section defining an enclosed spaced within that section;

the first intermediate section being positioned between the top section and the middle section, the second intermediate section being positioned between the middle section and the bottom section.

8. The bumper beam of claim 7, wherein the first and second intermediate sections are configured to define at least two longitudinal recesses in the front side of the bumper beam.

9. A method for forming a bumper beam having a plurality of sections comprising the steps of:
   (a) shaping a plurality of core segments into elongate elements having substantially trapezoidal cross sections;
   (b) wrapping each core segment with composite material comprising a multitude of anisotropic fibers embedded within a resin matrix;
   (c) placing the core segments in laterally abutting relationship so that their abutting walls are obliquely inclined with respect to a plane that is parallel to the front of the beam;
   (d) wrapping the abutting core segments as a unit with the composite material; and
   (e) curing the core segments as a unit in a compression mold.

10. The method of claim 9, wherein a substep of step (b) includes orienting the fibers of the composite material so that fibers comprising 70-85% of the weight of all the fibers extend continuously between the opposing ends of the beam with their longitudinal axes substantially parallel to the longitudinal axis of the bumper beam.

* * * * *